United States Patent [19]

Sollich

[11] Patent Number: 4,473,344
[45] Date of Patent: Sep. 25, 1984

[54] PROCESS AND APPARATUS FOR THE CONTINUOUS PRODUCTION OF A MALLEABLE MULTIPLE LAYER OF SWEETMEAT MATERIAL

[75] Inventor: Helmut Sollich, Rabenkirchen, Fed. Rep. of Germany

[73] Assignee: Sollich GmbH & Co. KG, Bad Salzuflen, Fed. Rep. of Germany

[21] Appl. No.: 324,996

[22] Filed: Nov. 25, 1981

[30] Foreign Application Priority Data

Sep. 10, 1981 [DE] Fed. Rep. of Germany ....... 3135857

[51] Int. Cl.$^3$ .......................... B29D 9/00; A23G 3/22; A23G 3/12
[52] U.S. Cl. .................................. 425/130; 118/414; 425/363; 425/367
[58] Field of Search ............... 118/407, 409, 412, 517, 118/107, 109, 110, 414, 232; 425/363, 367, 91, 92, 101, 133.5, 131.1, 365, 308, 310, 130, 90, 93, 94, 374; 99/450.1

[56] References Cited

U.S. PATENT DOCUMENTS

| | | | |
|---|---|---|---|
| 2,172,018 | 9/1939 | Spencer | 425/93 |
| 2,761,417 | 3/1956 | Russell et al. | 118/412 |
| 2,974,364 | 3/1961 | Lambert et al. | 425/93 |
| 4,205,951 | 6/1980 | Sollich | 425/130 |

FOREIGN PATENT DOCUMENTS 1036513 8/1958 Fed. Rep. of Germany ...... 118/412

Primary Examiner—Willard E. Hoag
Attorney, Agent, or Firm—Max Fogiel

[57] ABSTRACT

A first layer (a') of sweetmeat material (a) is charged onto a revolving heating/cooling roller (1) and is spread out thereon. At least one further sweetmeat mass (b), is applied at a circumferentially offset station, to this layer (a') to form a second layer (b') and define a combined sheet. This sheet is taken off the roller, transferred onto a conveyor belt (7) and delivered for further processing.

4 Claims, 3 Drawing Figures

PROCESS AND APPARATUS FOR THE CONTINUOUS PRODUCTION OF A MALLEABLE MULTIPLE LAYER OF SWEETMEAT MATERIAL

The invention relates to a process and apparatus for the continuous production of a malleable multiple layer of sweetmeat material, to be divided into sticks or bars.

To make multi-layer food products in the form of bars or sticks from the most diverse sweetmeat materials such as nougat, caramel and chocolate, from toffee masses, fudge or jelly, or from the most diverse kinds of sugar materials such as croquant, hard sugar or the like or from sweetmeat materials containing the most diverse cereals such as corn or rice flakes, or broken nuts, it has been conventional, as described in U.S. Pat. No. 2,612,851, to arrange charging devices for the various masses above a conveyor belt and to charge these masses in succession onto the conveyor belt which then had to be guided through cooling tunnels and processed further in a suitable way. The disadvantage of such installations is the high technical outlay and the excessive overall length. On the other hand, it has also become known from German Patent Specifications Nos. 2,534,131 and 2,827,404 originating from the present inventor to use revolving heating/cooling rollers for cooling sweetmeat masses. However, it is not possible to produce multi-layer sheets of material in this way.

The object of the invention is to provide an arrangement which reduces the space requirement and by means of which multi-layer sweetmeat sheets can be produced ready for further processing into sticks or bars.

The present invention provides a process for the continuous production of a malleable multiple layer of sweetmeat material, to be divided into sticks or bars, comprising charging a first layer of material for heating or cooling treatment onto a revolving heating/cooling roller at a first station, applying at least a second sweetmeat layer at a second station circumferentially offset from the first station onto the first layer, and removing the multiple layer sheet material so formed from the heating/cooling roller for further processing at a removal station.

The invention also resides in apparatus for the continuous production of a malleable multiple layer of sweetmeat material, to be divided into sticks or bars, comprising a rotatably driven heating/cooling roller, a first station having means for feeding sweetmeat material onto the periphery of the roller to form a first layer thereon, a second station circumferentially spaced from the first station and having means for feeding other sweetmeat material onto the first layer to form a second layer thereon and define a multiple layer sheet, and a removal station having means to remove the sheet from the roller.

Reference is now made to the accompanying drawings, wherein.

The heating/cooling roller 1, also called a shaping roller, is included in a coolant or heating-medium circuit and revolves continuously in the particular direction of the arrow marked. Depending on whether the sweetmeat masses charged are to be heated or solidified by cooling, hot water or a suitable coolant is passed through the system.

Distributed over the periphery of the heating/cooling roller 1 are, in this example, three charging stations I, II and III for still-malleable sweetmeat masses a, b and c. As required and depending on the number of layers desired, more or fewer charging stations can be distributed over the periphery of the heating/cooling roller.

Each charging station I, II and III has a supply vessel 2 which extends axially beyond the width of the roller 1 and is equipped with a controller 3 (filling level probe) for controlling the supply of the individual sweetmeat masses.

Figure 1:
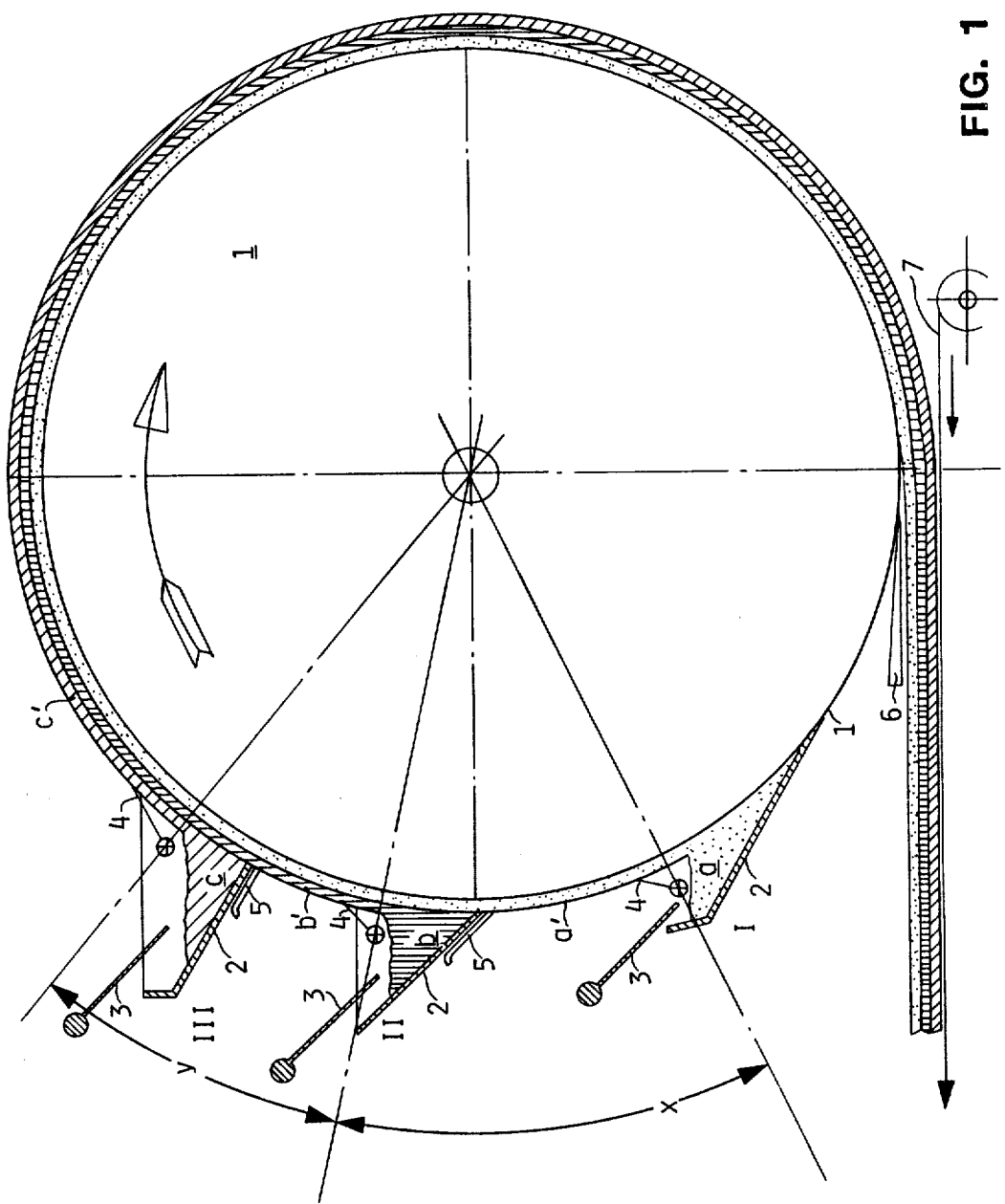
FIG. 1 is a diagrammatic representation of a side view of a heating/cooling roller with three charging points for sweetmeat masses.

In the embodiment of the device according to FIG. 1, a displaceable calibrating mechanism, a weir 4, which is adjustable and which controls in the manner of a scraping device the layer thickness of the particular mass deposited is located on each supply vessel 2 above the level of the material. Moreover, a scraping strip 5 which smoothes the previously formed sheet of material before it flows into the following supply vessel 2 is located on the underside of the supply vessels 2 for the masses b and c.

On the underside of the heating/cooling roller 1 there is a stripper 6 which extends over the entire width of the roller and which detaches from the roller 1 the multi-layer sheet of material composed of the layers of material a', b' and c' lying on top of one another. The sheet of material is transferred onto a conveyor belt 7 which is located under the roller and moves in the direction of the arrow and which can, if necessary, also be designed as a cooling belt, in order to cool further the multi-layer product web to the cutting temperature required for further processing. The product web formed in this way is delivered via the belt 7 to the further work stations in which the sheet is cut into strips lying next to one another and these are, in turn, divided into individual bars, blocks or the like. Such arrangements are known and do not form the subject of the present invention.

The mode of opertion of this device is as follows:

A still-malleable (e.g. liquid) sweetmeat mass a forms on the periphery of the roller, with the co-operation of the calibrating mechanism 4, a thin layer a' is charged out of the supply vessel 2 of the station I onto the heating/cooling roller 1 which is revolving, continuously. This layer a' flows past the mass supply vessel 2 of the station II. Here, a further layer b', the thickness of which is fixed by the respective calibrating mechanism, is deposited onto the layer a', from another sweetmeat mass b. The two layers of material a' and b', lying on top of one another and thus combined, now flow past the supply vessel 2 of the station III in which the covering layer c' is applied from a further sweetmeat mass c. The three layers of material lying on top of one another now flow together to the stripper 6 and are cooled on the periphery of the heating/cooling roller 1, so that they solidify sufficiently for a multi-layer sheet to be detached from the heating/cooling roller 1 by means of the stripper 6 and deposited as a whole on the conveyor belt 7.

The rotational speed of the heating/cooling roller 1 is adjustable according to the particular operating conditions. In the same way, the distance between the various supply vessels 2 on the periphery of the heating/cooling roller 1 can be varied, in order, in this way, to vary the residence times of the individual layers on the heating- /cooling roller to the particular sweetmeat mass being used and to the other working conditions. Thus, for example in the exemplary embodiment shown, the distance between the supply vessel for the mass b and the supply vessel of the mass a corresponds to the dimension x and the distance to the following supply vessel for the mass c corresponds to the dimension y.

Figure 2:
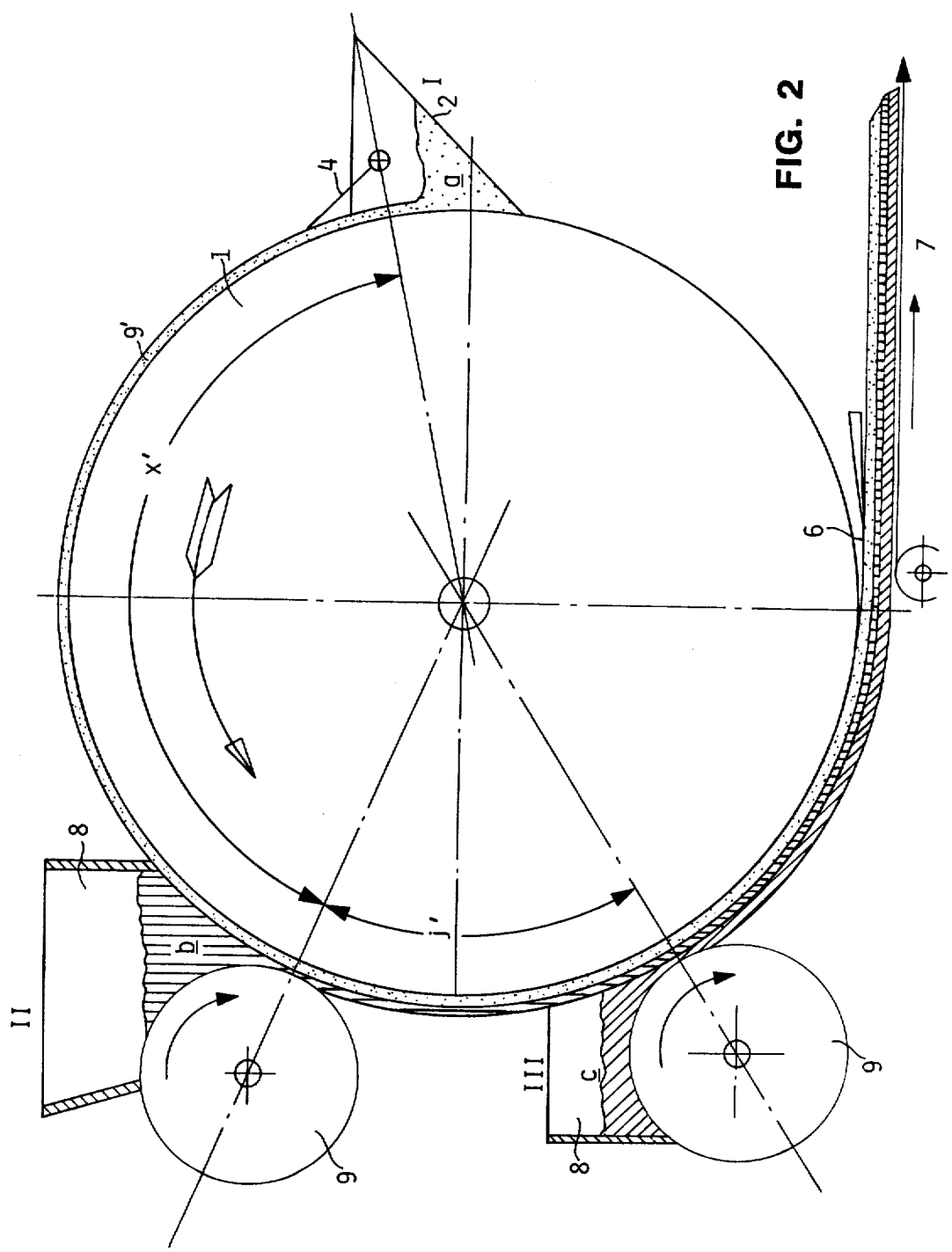
FIG. 2 is a representation similar to that of FIG. 1, of a modification.

In the arrangement according to FIG. 2, the heating-/cooling roller 1 revolves in an anti-clockwise direction as illustrated. Here, the station I for the sweetmeat mass a is located on the opposite side from the stations II and III, so as to allow a longer residence time for the layer off material a' for cooling purposes. Supply vessels 8 for the masses b and c are provided in the stations II and III, and the bottom of each of these vessels is formed by a calibrating roller 9 which revolves in a clockwise direction and which can itself also work as a heating-/cooling roller by being connected into a coolant circuit. The layer thickness of the sweetmeat mass charged can be regulated by appropriate adjustment of the calibrating roller 9.

The arrangement according to FIG. 2 is used especially when the first layer consists of a still liquid sweetmeat mass which has to be cooled and solidified over a relatively long region, whereupon one or two layers of a pasty material are subsequently deposited on the first layer of material a' in the stations II and III. As has already been said, with such pasty materials a rotating calibrating mechanism in the form of a smooth roller 9 which can be cooled or heated selectively is preferably provided. The liquid sweetmeat mass can be layered on top of pasty layers, if required.

Figure 3:
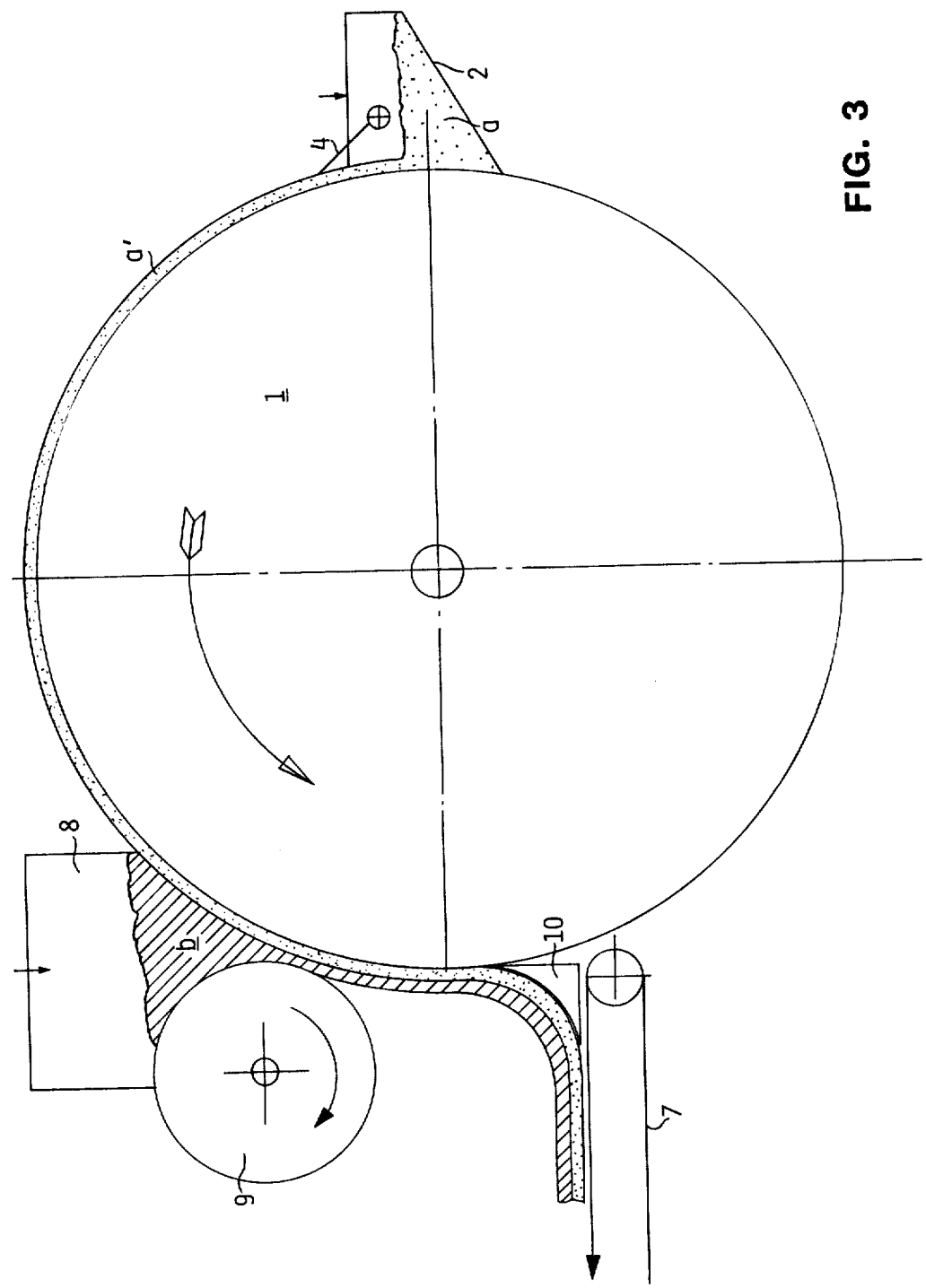
FIG. 3 is a representation of a heating/cooling roller with two material-charging stations.

FIG. 3 shows a further exemplary embodiment in which the multi-layer sheet does not flow up to the lowest point of the heating/cooling roller 1, as in FIGS. 1 and 2, but is lifted off beforehand by a, usually cooled, stripping knife 10 and deflected in the opposite direction onto the recooling or conveyor belt 7. Such an arrangement can be used especially for hard-boiled sugar materials (croquant, hard sugar, etc.) and for very porous products such as cereals or nuts mixed into a malleable mass. The shorter time of contact with the cooling shell of the heating/cooling roller 1, which results in the arrangement according to FIG. 3, prevents excessive cooling of the sheet and keeps it sufficiently elastic to be transferred onto the conveyor belt 7.

The layers of material on the roller may additionally be heated or cooled on their outer surfaces by further suitable heating/cooling means.

I claim:

1. Apparatus for the continuous production of a malleable multiple layer of sweetmeat material, to be divided into strips or bars, comprising: a rotatably driven roller having cooling means a first station having means for feeding sweetmeat material in a liquid state onto the periphery of the roller to form a first layer thereon, at least a second station circumferentially spaced from the first station and having means for feeding other sweetmeat material onto the first layer to form a second layer thereon, and define a multiple layer sheet, and a removal station having means to remove the sheet from the roller said second station being spaced from said first station so that said first layer of material charged onto said roller at said first station cools sufficiently to a firmness required for said first layer to be a carrier for additional layers, each of said first and second stations including a supply vessel extending axially of the roller and adjustable control means for determining the thickness of the layer of material formed from that in the supply vessel.

2. Apparatus according to claim 1, wherein the first and second stations are relatively adjustable circumferentially of the roller.

3. Apparatus according to claim 1, wherein each supply vessel is provided with means for controlling flow to the vessel.

4. Apparatus according to claim 1, wherein each control means comprises a cooling roller.

* * * * *